United States Patent [19]

Takimoto

[11] Patent Number: 5,426,826
[45] Date of Patent: Jun. 27, 1995

[54] RATCHET BUCKLE ASSEMBLY

[75] Inventor: Kazuhide Takimoto, Tokyo, Japan

[73] Assignee: Takigen Manufacturing Co. Ltd., Tokyo, Japan

[21] Appl. No.: 197,070

[22] Filed: Feb. 16, 1994

[30] Foreign Application Priority Data

Mar. 31, 1993 [JP] Japan .................. 5-096906

[51] Int. Cl.6 ............................................. B25B 25/00
[52] U.S. Cl. .................................................. 24/68 CD
[58] Field of Search ............ 254/218; 24/68 R, 685 B, 24/68 CD, 68 BT, 68 SK, 68 B, 68 D, 270, 191, 193, 170

[56] References Cited

U.S. PATENT DOCUMENTS

| 3,175,806 | 3/1965 | Prete, Jr. ............... | 29/68 CD |
| 4,185,360 | 1/1980 | Prete, Jr. et al. ........ | 24/68 CD |
| 4,199,182 | 4/1980 | Sunesson ............... | 24/68 CD |
| 4,227,286 | 10/1980 | Holmberg ............. | 24/68 CD |
| 4,542,883 | 9/1985 | Rutzki .................. | 24/68 CD X |
| 5,103,536 | 4/1992 | Kämper ................ | 24/68 CD |

Primary Examiner—James R. Brittain
Attorney, Agent, or Firm—Martin Smolowitz

[57] ABSTRACT

A ratchet buckle assembly which tightens a strap for binding a load. The assembly has its body 1 and handle 2 improved in mechanical strength, and prevents the load from being released from the strap by accident when the assembly is in its locked condition. A ratchet drive lever 4 is easily handled, and stabilized in its slidable operation. The assembly comprises: the body 1 constructed of arms 1a, 1b and a plate interposed therebetween; a winding shaft 7 constructed of plates 7a, 7b and supported between the arms 1a, 1b; a handle 2 constructed of arms 2a, 2b, a plate interposed therebetween and grips 10, 11; ratchet wheels 5a, 5b mounted on the shaft 7, wheel 5a being interposed between the arms 1a and 2a, the other wheel 5b being interposed between the arms 1b and 2b; a ratchet 3 for preventing the wheels 5a, 5b from rotating; and the lever 4 for rotatably driving the wheels 5a, 5b so that the strap is wound on the shaft 7.

3 Claims, 3 Drawing Sheets

RATCHET BUCKLE ASSEMBLY

BACKGROUND OF THE INVENTION

1. Field of the Invention

The present invention relates to a ratchet buckle assembly for tightening a strap for binding a load in a desired position in safely.

2. Description of tile Prior Art

In a conventional ratchet buckle assembly for tightening a strap, as disclosed in U.S. Pat. No. 4185360, a main body and a handle are separately constructed, and combined with each other together with a winding shaft, cross bars, grips and like components. Further provided in the conventional ratchet buckle assembly is a safety projections. In the conventional assembly, such projection is formed in a lower portion of the handle, and brought into contact with a notch portion of a ratchet so that the ratchet is fixedly engaged with each of opposite ratchet wheels to prevent the winding shaft from being reversely rotated in a condition in which the handle is in its eventually-locked up position. When the strap is loosed, a ratchet drive lever of the conventional assembly is pulled to have the handle rotated through an angle of approximately 180°. An end portion of the ratchet drive lever is bent at right angles to the remaining portion so as to form a grip of the lever. A spring means of the ratchet drive lever of the conventional assembly is constructed of a coil spring.

However, in the conventional ratchet buckle assembly having the above construction, in spite of the presence of a considerable load to which each of the main body and the handle is subjected, the conventional assembly is poor in mechanical strength since each of the main body and the handle of the conventional assembly has its arms formed independently of each other. Further, in the conventional assembly, since the ratchet is provided with the notch, the ratchet is poor in mechanical strength relative to each of the corresponding ratchet wheels for statically holding the load.

In addition, in the conventional assembly, the ratchet drive lever is poor in operability, particularly in a condition in which a large load is applied since a grip of the lever is too small in size. Further, in the conventional assembly, since the coil spring is used, it is hard for the ratchet drive lever to slidably move in a direction perpendicular to a longitudinal axis of the winding shaft, which makes it difficult to uniformly apply a load to the opposite ratchet wheels.

SUMMARY OF THE INVENTION

It is an object of the present invention to provide a ratchet buckle assembly for tightening a strap, in which each of a body, a handle and a ratchet is improved in mechanical strength; the strap is prevented from being loosened by accident in a condition in which the handle is held in its eventually-locked up position; a grip of a ratchet drive lever is easily operated to enhance a releasing operation of a load; and the ratchet drive lever is stabilized in motion in its slidable direction.

According to a first aspect of the present invention, the above object of the present invention is accomplished by providing:

A ratchet buckle assembly for tightening a strap, comprising:

a main body constructed of a pair of parallel-extending body arms and a plate interposed therebetween;

a winding shaft constructed of a pair of plates, the winding shaft being supported between the body arms;

a handle constructed of a pair of parallel-extending handle arms, a plate interposed therebetween and a pair of plastic grips;

a pair of ratchet wheels, one of which is interposed between the body arm and the handle arm and mounted on the winding shaft, the other of which ratchet wheels is interposed between the body arm and the handle arm and mounted on the winding shaft;

a ratchet for preventing the ratchet wheels from rotating; and a ratchet drive lever for rotatably driving the ratchet wheels so that a strap is wound on the winding shaft;

wherein the main body, the handle and the winding shaft are rotatable independently of each other; the ratchet wheels are fixedly mounted on the winding shaft so as to be rotatable together with the winding shaft; the ratchet is slidably mounted in a pair of slots formed in the body arms; the ratchet drive lever is slidably mounted in a pair of slots formed in the handle arms; the ratchet drive lever is engaged with the ratchet wheels to rotatably drive the winding shaft so that the strap is wound on the winding shaft, as the winding shaft rotates; and the ratchet is engaged with the ratchet wheels to prevent the winding shaft from being reversely rotated.

According to a second aspect of the present, invention, the above object of the present invention is accomplished by providing:

The ratchet buckle assembly for tightening the strap, as set forth in the first aspect of the present invention, wherein:

a locking hole is formed in each of opposite ends of the ratchet;

each of the handle arms is provided with a pair of projections to enhance the assembly's safety in its eventually locked condition; and a load, which is bound with the strap of the assembly, is prevented from being released by accident.

DESCRIPTION OF THE PREFERRED EMBODIMENTS

Figure 1:
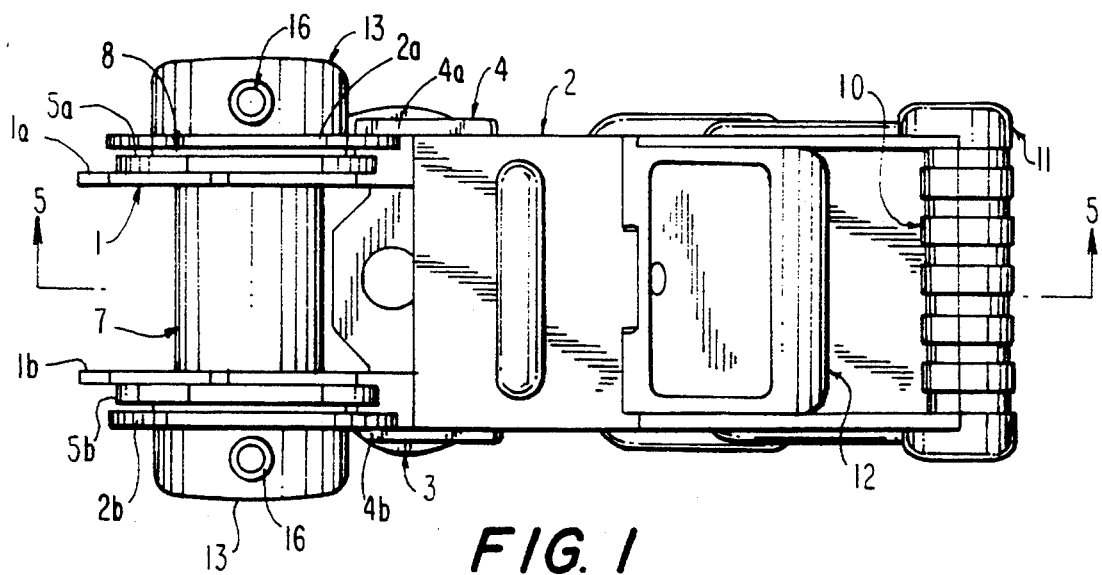
FIG. 1 is a front view of an embodiment of the ratchet buckle assembly of the present invention.

Hereinbelow, the present invention will be described in detail with reference to the accompanying drawings and the reference numerals and characters.

A ratchet buckle assembly for tightening a strap, is constructed of: a main body 1 constructed a pair of parallel-extending body arms 1a, 1b and a plate interposed therebetween; a winding shaft 7 constructed of a pair of curved plates 7a, 7b, the winding shaft 7 being supported between the arms 1a, 1b; a handle 2 constructed of a pair of parallel-extending handle arms 2a, 2b having a grip plate interposed therebetween and a pair of plastic grips 10, 11; a pair of ratchet wheels 5a, 5b, one 5a of which is interposed between the body arm 1a and the handle arm 2a and mounted on the winding shaft 7, the other 5b of which ratchet wheels 5a, 5b is interposed between the body arm 1b and the handle arm 2b and mounted on the shaft 7; a ratchet 3 for preventing the ratchet wheels 5a, 5b from rotating; and a ratchet drive lever 4 for rotatably driving the ratchet wheels 5a, 5b so that a strap is wound on the winding shaft 7.

In the ratchet buckle assembly of the present invention having the above construction, the main body 1, the handle 2 and the winding shaft 7 are rotatable independently of each other; the ratchet wheels 5a, 5b are fixedly mounted on the winding shall 7 so as to be rotatable together with the winding shaft 7; the ratchet 3 is slidably mounted in a pair of slots formed in the body arms 1a, 1b, and is abutted against the ratchet wheels 5a, 5b under the influence of a resilient force exerted by a ratchet spring 14; the ratchet drive lever 4 is slidably mounted in a pair of slots formed in the handle arms 2a, 2b and is engaged with t, he ratchet wheels 5a, 5b to rotatably drive the winding shaft 7 so that the strap is wound on the winding shaft 7 as the winding shaft 7 rotates; and the ratchet 3 is engaged with the ratchet wheels 5a, 5b to prevent the winding shaft 7 from being reversely rotated. Further, in the ratchet buckle assembly of the present invention, a locking hole 3c is formed in each of opposite ends 3a and 3b of the ratchet 3; each of the handle arms 2a, 2b is provided with a pair of projections 2c, 2d to enhance the assembly's safety in its eventually locked condition; and a load, which is bound with the strap of the assembly, is prevented from being released by accident.

In the ratchet buckle assembly of the present invention for tightening the strap, when the handle 2 is pulled up relative to the main body 1, the ratchet drive lever 4 is engaged with the ratchet wheels 5a, 5b so that the winding shaft 7 is rotated to wind the strap thereon. On the other hand, when the handle 2 is pushed down relative to the main body 1, the ratchet 3 is engaged with the ratchet wheels 5a, 5b so that the winding shaft 7 is prevented from being reversely rotated.

Figure 2:
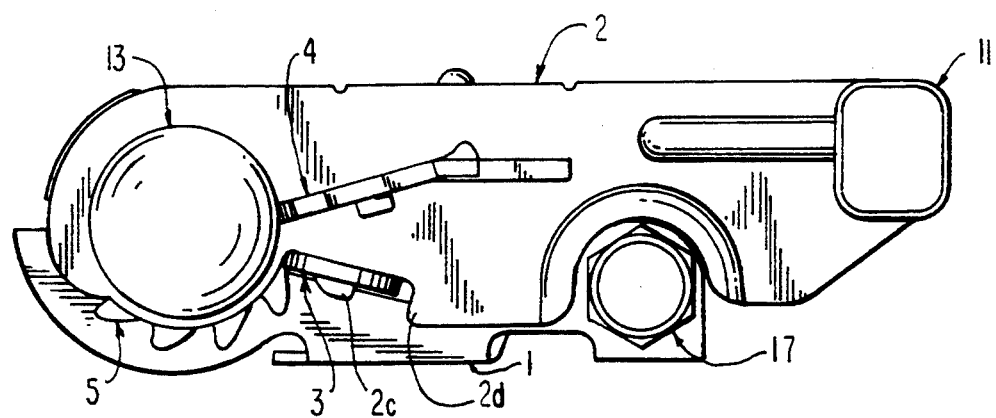
FIG. 2 is a bottom side view of the ratchet buckle assembly of the present invention shown in FIG. 1.
Figure 3:
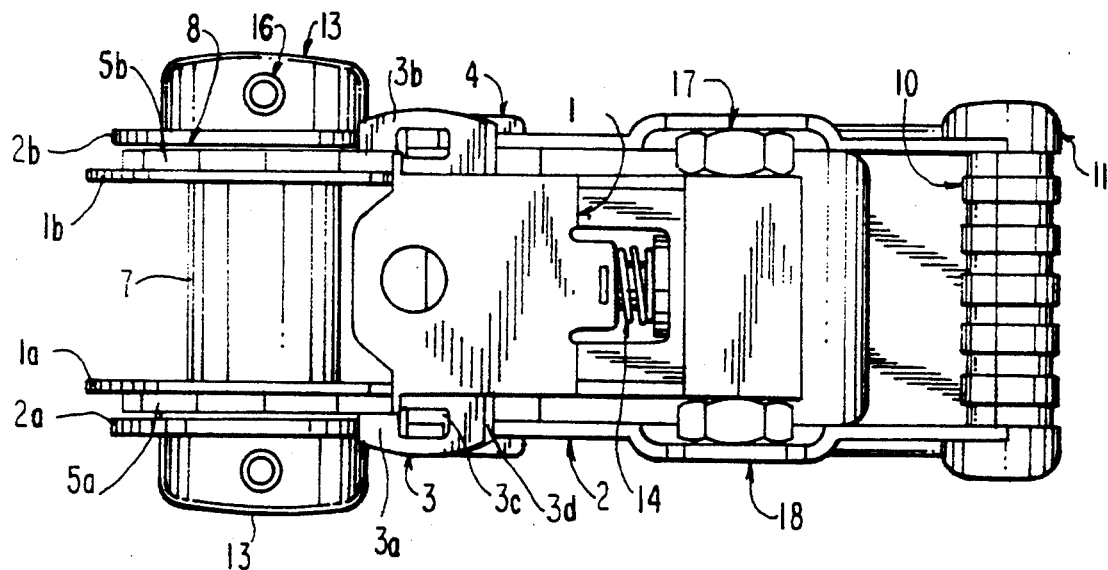
FIG. 3 is a rear view of the ratchet buckle assembly of the present invention shown in FIG. 1.
Figure 5:
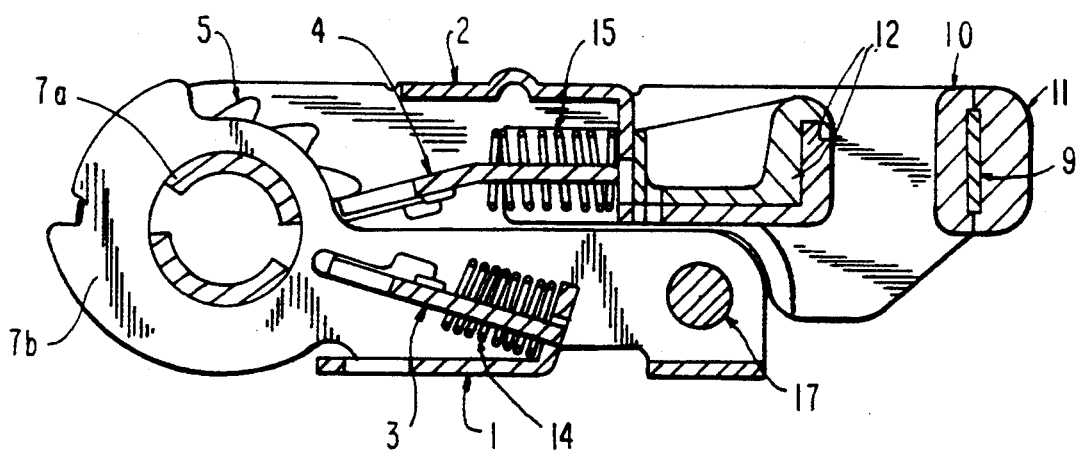
FIG. 5 is a longitudinal sectional view of the ratchet buckle assembly of the present invention, taken along the line 5—5 of FIG. 1.

When the winding shaft 7 winds the strap thereon to tighten the strap to a maximum extent, the handle 2 is held in its eventually-locked position as shown in FIG. 2. In such position, the safety projections 2c of the handle 2 are received in the locking holes 3c at the opposite ends 3a and 3b of the ratchet 3, while the other safety projections 2d of handle 2 abuts against, an outer end surface 3d of the ratchet 3, so that the ratchet 3 is prevented from being disengaged from the ratchet wheels 5a, 5b.

Further, a rib is provided in each of the interposed plate of the handle 2 and the plastic grips 10, 11 of the handle arms 2a, 2b so that the assembly of the present invention is improved in mechanical strength so as to sufficiently withstand the load applied by the thus tightened strap.

In the embodiment of the present invention shown in FIGS. 1 to 5, the main body 1 has its frame constructed of a pair of the parallel-extending body arms 1a, 1b and the plate interposed between these body arms 1a, 1b. On the other hand, the winding shaft 7 is constructed of a pair of the plates 7a, 7b mounted between the body arms 1a, 1b. The winding shaft 7 has each of its opposite ends connected with a shaft-staking plate 8 and a shalt cap 13; and fixed thereto through a tubular rivet 16. Namely, the winding shaft 7 is so mounted on the body arms 1a, 1b as to be rotatable relative to the main body 1. Each of the ratchet wheels 5a, 5b is fixedly mounted on the winding shaft 7 in a position outside each of the body arms 1a, 1b, and prevents the strap having been wound on the plates 7a, 7b of the winding shaft 7 from being released or unwound.

The slot formed in each of the body arms 1a, 1b permits the ratchet 3 being mounted therein to be movable therein. The ratchet 3 is provided with a pair of arm portions 3a, 3b in its opposite ends; and the pair of the locking holes 3c which are formed in such opposite ends to receive the projections 2c of the handle 2 therein. The ratchet 3 is slidably movable under the influence of a resilient force exerted by the ratchet spring 14 which has one of its opposite ends abutted against a bracket of the main body 1 and the other of its opposite ends abutted against the ratchet 3. In a condition in which the handle 2 is not pulled up relative to the main body 1, the ratchet spring 14 has the arm portions 3a and 3b of the ratchet 3 engaged with the ratchet wheels 5a and 5b, respectively. Namely, in this condition, the ratchet 3 is fixed to the main body 1.

The strap is wound on the winding shaft 7 when the handle 2 is pulled up and then pushed down relative to the main body 1. A bolt 17 extends between the body arms 1a, 1b and is threadably engaged with a nut 18 so that the strap is fixed to an object, for example such as a wall of a load-carrying platform of a vehicle and the like.

The handle 2 is constructed of the pair of the parallel-extending handle arms 2a, 2b and the plate interposed between the handle arms 2a, 2b to form a one-piece sheet frame. The plastic grips 10, 11 are fixedly mounted on a grip plate 9 of the handle 2. The handle arms 2a and 2b are rotatably supported between the ratchet wheel 5a and the shaft-staking plate 8; and the ratchet wheel 5b and the other shaft-staking plate 8, respectively. Mounted in the slots formed in the handle arms 2a, 2b is the ratchet drive lever 4. The lever 4 is provided with a pair of ratchet arms 4a, 4b adjacent to the ratchet wheels 5a, 5b; and a plastic lever 12 in its rear side. The plastic lever 12 is fixedly mounted on the rear side of the ratchet drive lever 4, which is slidable in the slots of the handle arms 2a, 2b under the influence of the resilient force exerted by a biasing spring 15. The spring 15 has one of its opposite ends abut against the bracket (which extends from the interposed plate of the handle 2); and the other of its opposite ends abut against the ratchet drive lever 4. Under the influence of the resilient force exerted by this biasing spring 15, the ratchet arms 3a, 3b are engaged with the ratchet wheels 5a. 5b when the handle 2 is pulled up relative to the main body 1, so that the ratchet wheels 5a, 5b are rotatably driven to wind up the strap on the winding shaft 7. Further, the plastic lever 12 improves the handle 2 in operability with respect to the main body 1.

Figure 4:
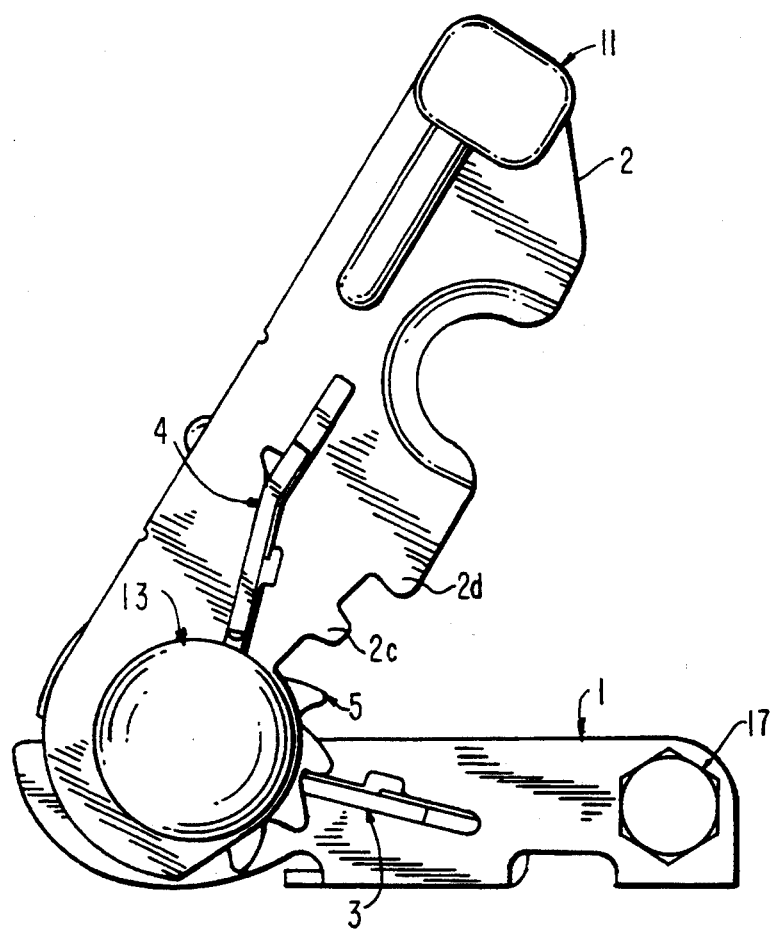
FIG. 4 is a front view of the ratchet buckle assembly of the present invention shown in FIG. 1, illustrating a condition in which the handle is operated.

The projections 2c and 2d of the lower portion of the handle 2 are provided in each of the handle arms 2a and 2b, respectively. The projections 2c, 2d are provided with cam-action surfaces which act in the eventually-locked position of the handle 2 to firmly lock up the handle 2 therein. In operation, the strap is pulled and wound on the winding shaft 7 by operating the handle 2 relative to the main body 1. Namely, as shown in FIG. 4, the ratchet drive lever 4 rotatably drives the ratchet wheels 5a, 5b as the handle 2 is moved upward. The ratchet 3 holds the ratchet wheels 5a, 5b each time the handle 2 clears an arch-shaped portion of each tooth in each of the ratchet wheels 5a, 5b and pushed down relative to the main body 1. When the strap is tightened to its maximum extent, the handle 2 is pushed down relative to the main body 1 and held in it locked position, as shown in FIG. 2. In such locked position of the handle 2, the projections 2c and 2d of the handle 2 are adjacent to the locking hole 3c and the outer end surface 3d of the ratchet 3, respectively and restrain its movement. As a result, the ratchet arms 3a and 3d of the ratchet 3 are engaged securely with the ratchet wheels 5a and 5b, respectively. Once the handle 2 is held in its eventually-locked position, the projections 2c, 2d of the handle 2 prevent the ratchet 3 from moving away from the ratchet wheels 5a, 5b, even when the ratchet buckle assembly of the present invention is subjected to strong vibrations and/or cyclic variations in the strap's tension.

As described above, in the ratchet buckle assembly of the present invention for tightening the strap binding the load, each of the main body 1 and the handle 2 is formed into a one-piece member. Particularly, as to the handle 2, since the handle 2 is provided with three ribs, the handle 2 has a sufficient mechanical strength, which increases a load-supporting capacity of the frame of the ratchet buckle assembly of the present invention. The load is applied to the frame through the strap.

Further, in the ratchet buckle assembly of the present invention, the ratchet 3 is increased in load-bearing area and is provided with the locking holes in its opposite ends 3b, 3b, while the handle 2 is provided with the projections 2c, 2d, so that the ratchet 3 is strengthened in mechanical strength in operation. Consequently, the ratchet buckle assembly of the present invention may prevent the load or article from being released by accident.

Furthermore, in the ratchet buckle assembly of the present invention, since the ratchet drive lever 4 is provided with the plastic grips 10, 11 the user can operate the lever ratchet 4 in an easy manner to release the load or article, which improves the assembly of the present invention in operability.

What is claimed is:

1. A ratchet buckle assembly for tightening a strap, comprising:
    a main body (1) constructed of a pair of parallel-extending body arms (1a, 1b) and a plate interposed therebetween;
    a winding shaft (7) constructed of a pair of plates (7a, 7b), said winding shaft (7) being supported between said body arms (1a, 1b);
    a handle (2) constructed of a pair of parallel-extending handle arms (2a, 2b), and having a plate interposed therebetween and a pair or plastic grips (10, 11), each of said handle arms (2a, 2b) being provided with a pair of projections (2c, 2d);
    a pair of ratchet wheels (5a, 5b) one wheel (5a) of which is interposed between said body arm (1a) and said handle arm (2a) and mounted on said winding shaft (7), the other wheel (5b) of which is interposed between said body arm (1b) and said handle arm (2b) and mounted on said winding shaft (7);
    a ratchet (3) for preventing said ratchet wheels (5a, 5b) from rotating said ratchet having a locking hole (3c) formed in each of opposite ends (3a, 3b) of the ratchet (3); and
    a ratchet drive lever (4) for rotatably driving said ratchet wheels (5a, 5b) so that a strap can be wound on said winding shaft (7);
    wherein said main body (1), said handle (2) and said winding shaft (7) are rotatable independently of each other; said ratchet wheels (5a, 5b) are fixedly mounted on said winding shaft (7) so as to be rotatable together with said winding shaft (7); said ratchet (3) is slidably mounted in a pair of slots formed in said body arms (1a, 1b); said ratchet drive lever (4) is slidably mounted in a pair of slots formed in said handle arms (2a, 2b); said ratchet drive lever (4) is engaged with said ratchet wheels (5a, 5b) to rotatably drive said winding shaft (7) as said winding shaft (7) rotates; and said ratchet (3) is engaged with said ratchet wheels (5a, 5b) to prevent said winding shaft (7) from being reversely rotated.

2. The ratchet buckle assembly according to claim 1, wherein said ratchet (3) is slidably moveable by a resilient force exerted by a ratchet spring (14).

3. The ratchet buckle assembly according to claim 1, wherein said drive lever (4) is slidably moveable in slots in said handle arms (2a, 2b) by a resilient force exerted by a spring (15).

* * * * *